Aug. 17, 1948.  W. P. McKINNIE ET AL  2,447,079
FOLDING RUDDER PEDALS
Filed June 12, 1943
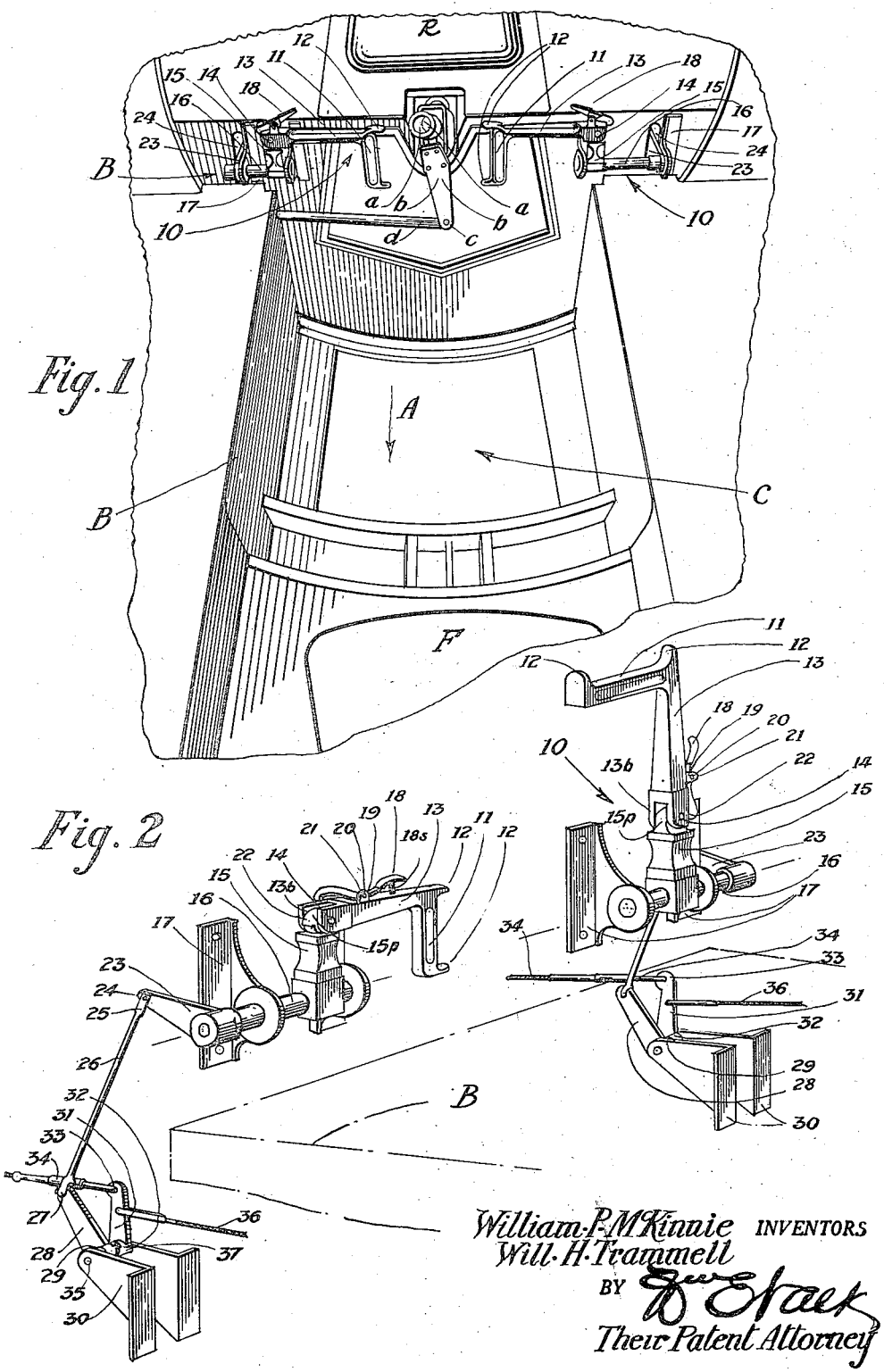
William P. McKinnie
Will. H. Trammell  INVENTORS
BY
Their Patent Attorney Patented Aug. 17, 1948

2,447,079

UNITED STATES PATENT OFFICE 2,447,079

FOLDING RUDDER PEDALS

William P. McKinnie, Kenmore, N. Y., and Will H. Trammell, Columbus, Ohio, assignors to Curtiss-Wright Corporation, a corporation of Delaware Application June 12, 1943, Serial No. 490,692

4 Claims. (Cl. 244—86)

This invention relates to rudder pedals of the folding type which can be employed for rudder control purposes in aircraft at certain times, such as in an emergency, but which normally may be folded into an out-of-the-way position so as not to interfere with other activities in the aircraft.

In aircraft of a certain type it is normal to have an observer's or photographer's position in the aircraft immediately in the rear of the pilot's position and while the pilot normally attends to all the duties of flight control and while the observer normally is occupied with the operation of an aerial camera or of a machine gun, yet in periods of emergency, as when the pilot may become a casualty, it is desirable that the observer be able to take over the control of the aircraft. To this end it is requisite that auxiliary flight controls be provided in the rear or observer's cockpit or station.

One of the objects of this invention is to provide auxiliary rudder pedals for the purpose described and another object is to render them foldable so that when not in use, they can be moved into a position where they will not project into space in the observer's cockpit nor will they interfere with the normal duties or movements of the observer. On the other hand, these pedals can be moved into operative position in which they become instantly available and effective as a means of operating the rudder control system. Still another object is to equip such foldable rudder pedals with self-acting locking means which will automatically lock them in the operative position when they have been moved into that position from the stowed position.

With these and other objects in view, the present invention has been developed in the particular form described, and shown in the accompanying drawings. While this form is illustrative of the invention, it is not intended as a limitation to one particular form as many changes can be made without departing from the scope and teachings of this disclosure.

In the drawings:

Fig. 1 is a fragmentary view of the interior floor area of an aircraft showing the location and arrangement of the folding rudder pedals; and Fig. 2 is a perspective view showing the constructional detail of the folding rudder pedals.

Referring to Fig. 1, the forward direction within the aircraft is indicated by the arrow A. In this figure, which accordingly is being viewed looking rearwardly, a portion of the front pilot seat indicating the forward pilot position is represented by the letter F, and a portion of the corresponding rear pilot seat and position is designated by the letter R. The portion of the fuselage floor beneath the rear pilot position R is somewhat higher than the floor portion forward of the transverse bulkhead or step separating these two floor portions. The fuselage structure B, which is shown fragmentarily, includes an opening C provided below a camera installation point. Normally, the camera and its mounting structure would occupy the space above and surrounding this opening but this equipment has been omitted from the figure as it would hide the auxiliary control assemblies which are located directly to the rear thereof. This auxiliary equipment consists of a socket member $a$ designed to receive an auxiliary control stick (not shown) and a pair of folding rudder pedal assemblies 10.

The provision for the attachment of the auxiliary control stick, while not considered a part of the present invention, is associated therewith and consists of a universally mounted socket member $a$ from which depends a crank lever $b$ which at its otherwise free extremity is pivotally connected as at $c$ to a push-pull rod $d$ which links it to the aileron-elevator control system of the airplane.

The two folding rudder pedals comprising this invention are disposed on either side of the socket $a$ in spaced relation thereto in accordance with the usual grouping of the control levers. The pedals are shown folded in Fig. 1 and it is evident that the pedal spacing is sufficient to provide for folding without interference with the socket $a$, lever $b$, or rod $d$ and furthermore, when the pedals are in operative position there will also be more than enough clearance to allow operation of the auxiliary control stick.

The rudder pedal assemblies 10 are identical except to the extent that they are made up for right and left hand mounting and thus a description of one will suffice for both. The pedal member itself consists of a foot receiving cross bar portion 11 at either end of which are foot retaining projections 12. The bar 11 is cantilevered from a stem 13 which at its other end is pivotally joined to an upright member 15. The pivotal joint between the stem and member 15 is formed by a pin connection 14 between bifurcations 13b on the end of the stem which straddle a projection 15p extending from the upper end of member 15. The bifurcated end is formed substantially square in section with angular corners but one edge is rounded off as shown in Fig. 2 so that pivotal movement of the stem 13 can occur between the vertical position of the right hand pedal as shown in Fig. 2 and the folded horizontal position of the left hand pedal. This rounded edge permits folding in one direction while the opposite angular edge prevents folding from the vertical to the horizontal in the opposite direction about pivot pin 14.

In order to lock the rudder pedal in its operative position, a spring pressed latch 18 is provided and pivotally mounted by means of brackets or lugs 19 on the stem 13. One end of this latch is formed as a thumbpiece under which the spring 18s is mounted while the other end is formed with a hook adapted to engage a lip 22 on the portion 15p of member 15. Such engagement locks the stem 13 in vertical alignment with member 15 but manual pressure on the thumbpiece of latch 18 will be effective to release the lock and allow folding of the pedal.

The member 15 is rigidly attached to a stub shaft 16 which extends transversely through the bottom end thereof. This shaft is supported by a pair of bearing brackets 17 which are mounted on a bulkhead portion of the aircratf structure B. The shaft 16 extends beyond the outermost bracket 17 in each case and is fitted with a projecting lever 23 which is rotationally a unit therewith. The extremity of this lever 23 has pivotally connected thereto as at 24, the end 25 of a rod 26 which at its other end is similarly connected as at 27 to the end of a lever 28. At its opposite end 29 this lever is rotationally supported on a pin 35 and the pin is in turn supported by a pair of spaced brackets 30 which may be affixed to a convenient portion of the aircraft structure B.

Also carried by the pin 35 is a second lever 31 in rotational independence of the pin in the same manner as lever 28. At the extremity of lever 31 is pivotally connected one end of a cable connector 34 which provides direct connection to the rudder or to a rudder operating instrumentality. At the same time a second connection is made to this lever which through the member 36 provides for connection to the corresponding main rudder pedal located forwardly in the pilot's cockpit.

With this arrangement the levers 31 partake of all of the movements of the rudder control system which originate at the main rudder pedals and, through an interconnection to be described, also serve as a means of introducing to the rudder control system, control movements which originate at the auxiliary rudder pedals 11. The interconnection just mentioned is made between the hub portions 29 and 32 of the respective levers 28 and 31 and is shown at 37. It consists in the partial interfitting of the abutting ends of the two hub portions 29 and 32 in a manner well known so that rotation of hub 29 in a clockwise direction will cause similar rotation of hub 32. However, due to lost motion in the connection, counterclockwise movement of hub 32 will not necessarily effect rotation of hub 29. Thus the control operation of the system will not affect the auxiliary pedal but operation of the auxiliary pedal in the clockwise direction will affect the control system.

An alternative to the foregoing type of interconnection would be to provide a rigid connection between the levers 28 and 31. With a rigid connection, the rudder pedals would partake of all of the movements of the control system but with the pedals in folded position, the slight angular movement of member 15 would not cause an appreciable projection of the pedals into the cockpit space and would not necessarily be objectionable.

In the preferred form of our invention, the pin 14 of the folding joint of each pedal crank is arranged transversely of the axis of pedal rotation about the torque tube 16. This causes the folding of the pedal to take place in a direction transverse to the fore and aft direction of movement of the pedal and therefore operational forces do not act to cause folding of the device. These features are susceptible of change and all such changes are intended to fall within the scope of the invention as measured by the appended claims.

Having thus described our invention, we claim:

1. In a dual-control tandem-position aircraft, a forward pilot position, a rearward auxiliary position, a transverse bulkhead intermediately disposed between said positions, a pair of rudder pedal units laterally disposed on opposite sides of the longitudinal plane of symmetry of the aircraft, mounting means for said pedal units including a horizontally supported torque tube for each said pedal unit extending transversely to the said plane of symmetry and rotatable in response to forward pedal movements, a pedal crank extending radially and upwardly from each said torque tube, a hinge joint in each said pedal arranged to permit folding of said pedals toward said plane of symmetry and in a transverse vertical plane containing the axis of its said torque tube with said folded pedals contiguous to said bulkhead arranged to permit access to said forward pilot position from said rearward auxiliary position unimpeded by said rudder pedals and means to lock each said pedal crank in its unfolded operable position.

2. In a dual-control aircraft installation, a forwardly disposed pilot position, a rearwardly disposed auxiliary pilot position, a camera position intermediately disposed between said tandem pilot positions, a transverse wall defining the rearward margin of said camera position, a pair of rudder pedal units laterally disposed on opposite sides of the longitudinal plane of symmetry of the aircraft adjacent the forwardly disposed face of said transverse wall, mounting means for said pedal units including a horizontally disposed torque tube for each said pedal unit journalled upon said wall face extending transversely to the said plane of symmetry and rotatable in response to forward pedal movements, a lever extending from each said torque tube adapted to provide an interconnection with the rudder operating cable system of the aircraft, a pedal crank extending radially from each said torque tube, a hinge joint in each said pedal crank arranged with its pivotal axis disposed in a longitudinal horizontal direction above said torque tube and adapted to permit inward and downward folding movement of each said pedal crank in a transverse plane normal to said plane of symmetry to provide access to said camera position from said auxiliary pilot position and means to lock said hinge joints against folding movements in the operative positions of said pedal cranks.

3. In a dual-control airplane having a forward pilot position, a rearward pilot position, a rear floor portion beneath the said rearward pilot position, a vertical bulkhead disposed between the said forward and rearward pilot positions and terminating at its upper limits in the region of said rear floor portion, a pair of folding rudder pedals rotatably journalled on the forward face of said vertical bulkhead and provided with lockable hinge means arranged for lateral inward folding toward each other whereby access from said rearward pilot position toward said forward pilot position is unimpeded by said rudder pedals.

4. In a dual-control airplane having tandem arranged pilot positions within the fuselage of said airplane, a horizontal floor portion beneath the rearward one of said pilot positions, a vertical bulkhead disposed between the forward and rearward pilot positions terminating at its upper limit adjacent the level of said horizontal floor portion beneath the rear one of said pilot positions, a camera well in the fuselage floor portion forward of said bulkhead, a pair of folding rudder pedals rotatably journalled upon the forward face of said vertical bulkhead provided with releasable locking means for lateral folding of said rudder pedals arranged to provide access to said camera well from said rearward pilot position unimpeded by said rudder pedals.

WILLIAM P. McKINNIE.
WILL H. TRAMMELL.

REFERENCES CITED

The following references are of record in the file of this patent:

UNITED STATES PATENTS

| Number | Name | Date |
|---|---|---|
| 1,243,165 | Harley | Oct. 16, 1917 |
| 1,802,117 | Leisy | Apr. 21, 1931 |
| 1,902,094 | Page | Mar. 21, 1933 |
| 2,024,549 | Tarris | Dec. 17, 1935 |
| 2,240,259 | Gwinn | Apr. 29, 1941 |